(12) United States Patent
Xu

(10) Patent No.: US 12,144,283 B2
(45) Date of Patent: Nov. 19, 2024

(54) ROBOTIC LAWN MOWER HAVING A HEIGHT ADJUSTMENT

(71) Applicant: Nanjing Chervon Industry Co., Ltd., Nanjing (CN)

(72) Inventor: Haishen Xu, Nanjing (CN)

(73) Assignee: Nanjing Chervon Industry Co., Ltd. (CN)

( * ) Notice: Subject to any disclaimer, the term of this patent is extended or adjusted under 35 U.S.C. 154(b) by 966 days.

(21) Appl. No.: 17/113,541

(22) Filed: Dec. 7, 2020

(65) Prior Publication Data

US 2021/0168999 A1 Jun. 10, 2021

(30) Foreign Application Priority Data

Nov. 30, 2020 (CN) .......................... 202011370802.3

(51) Int. Cl.
*A01D 34/74* (2006.01)
*A01D 34/00* (2006.01)
(Continued)

(52) U.S. Cl.
CPC ........... *A01D 34/74* (2013.01); *A01D 34/008* (2013.01); *A01D 34/78* (2013.01); *A01D 69/02* (2013.01); *A01D 2101/00* (2013.01)

(58) Field of Classification Search
CPC ........ A01D 34/74; A01D 34/76; A01D 34/78; A01D 69/00–69/12; A01D 34/00–34/905; A01D 2101/00
See application file for complete search history.

(56) References Cited

U.S. PATENT DOCUMENTS 3,114,229 A * 12/1963 Wilson .................. A01D 34/74
56/11.8
3,247,654 A * 4/1966 Nemeth ................ A01D 34/74
172/12
(Continued)

FOREIGN PATENT DOCUMENTS

CN 201491508 U 6/2010
CN 201830660 U 5/2011
(Continued)

OTHER PUBLICATIONS

EPO, extended European search report issued on European patent application No. 20211395.7, dated Apr. 21, 2021, 8 pages.

*Primary Examiner* — Adam J Behrens
*Assistant Examiner* — Madeline I Runco
(74) *Attorney, Agent, or Firm* — Greenberg Traurig, LLP

(57) ABSTRACT

A robotic lawn mower includes a mowing system, a housing, a working assembly and an energy source device. The mowing system includes a cutting assembly, a driving mechanism, and a height adjusting mechanism. The cutting assembly includes a mowing member for cutting the grass and a mounting shaft for mounting the mowing member. The mounting shaft is capable of rotating about a first axis relative to the housing. The driving mechanism includes a driving shaft for driving the cutting assembly to rotate. The height adjusting mechanism is used to adjust the movement of the cutting assembly along the first axis to achieve different cutting heights of the mowing member. When the height adjusting mechanism adjusts the cutting assembly to move along the first axis, the mounting shaft moves relative to the driving shaft along the first axis.

20 Claims, 5 Drawing Sheets

(51) Int. Cl.
*A01D 34/78* (2006.01)
*A01D 69/02* (2006.01)
*A01D 101/00* (2006.01)

(56) References Cited

U.S. PATENT DOCUMENTS

| | | | | |
|---|---|---|---|---|
| 2009/0308037 | A1* | 12/2009 | Wang | A01D 34/76 56/11.6 |
| 2016/0100523 | A1* | 4/2016 | Anderson | A01D 34/66 56/6 |
| 2020/0170186 | A1* | 6/2020 | Curtis | F16H 25/20 |
| 2020/0375091 | A1* | 12/2020 | Kuriyagawa | A01D 34/54 |

FOREIGN PATENT DOCUMENTS

| | | | | |
|---|---|---|---|---|
| CN | 203456989 | U | | 2/2014 |
| CN | 204013053 | U | | 12/2014 |
| CN | 105075498 | A | | 11/2015 |
| CN | 206713421 | U | * | 12/2017 |
| CN | 107804289 | A | | 3/2018 |
| CN | 108391501 | A | | 8/2018 |
| CN | 109496531 | A | | 3/2019 |
| CN | 110214538 | A | * | 9/2019 |
| DE | 3411354 | C2 | * | 4/1991 |
| EP | 0490070 | A1 | * | 6/1992 |
| EP | 0531071 | A1 | | 3/1993 |
| EP | 0634091 | A | | 1/1995 |
| EP | 2422602 | A1 | * | 2/2012 ........... A01D 34/008 |
| EP | 2625947 | A1 | | 8/2013 |
| EP | 3047719 | A1 | * | 7/2016 ............. A01D 34/74 |
| EP | 3231271 | A1 | * | 10/2017 ........... A01D 34/008 |
| GB | 1029110 | A | * | 5/1966 |
| GB | 2405307 | A | | 3/2005 |
| JP | 2015130818 | A | | 7/2015 |
| NO | 2019163120 | A1 | | 8/2019 |
| WO | 2019163120 | A1 | | 8/2019 |

* cited by examiner

ROBOTIC LAWN MOWER HAVING A HEIGHT ADJUSTMENT

RELATED APPLICATION INFORMATION

This application claims the benefit under 35 U.S.C. § 119(a) of Chinese Patent Application No. CN 201911245936.X, filed on Dec. 7, 2019, and Chinese Patent Application No. CN 202011370802.3, filed on Nov. 30, 2020, which applications are incorporated herein by reference in their entirety.

TECHNICAL FIELD

The present disclosure relates to garden tools, in particular to a lawn mower and a robotic lawn mower.

BACKGROUND

A lawn mower is one of commonly used garden tools, which is mainly used for mowing all kinds of lawns. Compared with a traditional lawn mower, robotic lawn mowers can run autonomously and complete mowing according to a planned path, which can save a lot of labor, reduce the cost of lawn maintenance and improve labor efficiency. Moreover, they use electric energy and scientifically plan a path, thereby reducing repetitive work and saving energy.

At present, most robotic lawn mowers can usually move the height of their mowing systems up and down in order to achieve different mowing heights. However, structures of an adjusting mechanism and components adjusted by the adjusting mechanism of the mowing systems are relatively complex, the stability of the robotic lawn mowers is poor, the structures are complex, and the stability is poor during adjusting.

SUMMARY

In one example of the disclosure, a robotic lawn mower includes: a mowing system for mowing grass; a housing configured to support the mowing system; a working assembly including a working wheel configured to support the housing to drive the robotic lawn mower to walk on a ground; and an energy source device used to provide energy source. The mowing system includes: a cutting assembly including a mowing member for cutting the grass and a mounting shaft for mounting the mowing member, wherein the mounting shaft is capable of rotating about a first axis relative to the housing; a driving mechanism including a driving shaft for driving the cutting assembly to rotate; and a height adjusting mechanism for adjusting the movement of the cutting assembly along the first axis to achieve different cutting heights of the mowing member. When the height adjusting mechanism adjusts the cutting assembly to move along the first axis, the mounting shaft moves relative to the driving shaft along the first axis.

In one example, when the height adjusting mechanism drives the cutting assembly to move along the first axis, the position of the driving shaft relative to the housing in the first axis remains constant.

In one example, the driving shaft is formed with a driving portion for driving the mounting shaft to rotate synchronously with the driving shaft and the driving portion allows the mounting shaft to move relative to the driving shaft along the first axis.

In one example, the driving shaft is formed with a mounting hole extending along the first axis, the mounting shaft is inserted into or passes through the mounting hole, and the driving portion is formed on a hole wall of the mounting hole.

In one example, the height adjusting mechanism includes an operating member for a user to operate, an adjusting assembly including an adjusting member and a mounting bracket for mounting the mounting shaft, and when the operating member is operated by the user, the adjusting member drives the mounting bracket to move along the first axis.

In one example, the adjusting member is capable of rotating about a rotation axis relative to the housing, and the adjusting member and the mounting bracket form a transmission fit that can convert the rotation of the adjusting member into a sliding movement of the mounting bracket along the first axis.

In one example, the driving mechanism further includes a prime mover used to output power, and when the height adjusting mechanism adjusts the cutting assembly to move along the first axis, the prime mover remains fixed relative to the housing along the first axis.

In one example, the driving mechanism further includes a prime mover for outputting power to drive the cutting assembly to cut the grass, and when the height adjusting mechanism adjusts the cutting assembly to move along the first axis, the mounting shaft moves relative to the prime mover along the first axis.

In one example, the driving shaft is a prime mover shaft of the prime mover.

In one example, the driving mechanism further includes a transmitting assembly for realizing a power transmission between the prime mover and the mounting shaft, and the driving shaft is a power output member of the transmitting assembly.

In one example, when the height adjusting mechanism adjusts the cutting assembly to move along the first axis, the position of the transmitting assembly relative to the housing along the first axis remains constant.

In one example, the prime mover includes a prime mover shaft and the prime mover shaft is capable of rotating about a second axis that is parallel to and not coincident with the first axis.

In one example, the prime mover includes a prime mover shaft which is capable of rotating about a second axis perpendicular to or inclined to the first axis.

In one example, the height adjusting mechanism further includes a driving motor for driving the mounting shaft to move along the first axis.

In one example, the driving mechanism includes a prime mover for outputting power to drive the cutting assembly to mow grass, and the prime mover and the driving motor are arranged in the housing.

In one example of the disclosure, a robotic lawn mower includes: a mowing system for mowing grass; a housing configured to support the mowing system; a working assembly including a working wheel configured to support the housing to drive the robotic lawn mower to walk on a ground; and a battery pack used to provide energy source. The mowing system includes: a cutting assembly including a mowing member for cutting the grass and a mounting shaft for mounting the mowing member, wherein the mounting shaft is capable of rotating about a first axis relative to the housing; a driving mechanism including a electric motor for driving the cutting assembly to rotate; and a height adjusting mechanism for adjusting the movement of the cutting assembly along the first axis to achieve different cutting heights of the mowing member. Wherein when the height adjusting mechanism adjusts the cutting assembly to move along the first axis, the mounting shaft moves relative to the electric motor along the first axis.

In one example, the driving mechanism further includes a transmitting assembly for realizing a power transmission between the electric mover and the mounting shaft, and when the height adjusting mechanism adjusts the cutting assembly to move along the first axis, the mounting shaft moves relative to the transmitting assembly along the first axis.

In one example, the height adjusting mechanism further includes a driving motor for driving the mounting shaft to move along the first axis.

In one example, the electric motor is fixedly mounted to the housing.

In one example of the disclosure, a lawn mower includes: a mowing system for mowing grass; a housing configured to support the mowing system; a working assembly including a working wheel configured to support the housing to drive the lawn mower to walk on a ground; and a battery pack used to provide energy source. The mowing system includes: a cutting assembly including a mowing member for cutting the grass and a mounting shaft for mounting the mowing member, wherein the mounting shaft is capable of rotating about a first axis relative to the housing; a driving mechanism including a electric motor for driving the cutting assembly to rotate; and a height adjusting mechanism for adjusting the movement of the cutting assembly along the first axis to achieve different cutting heights of the mowing member. When the height adjusting mechanism adjusts the cutting assembly to move along the first axis, the position of the electric motor relative to the housing in the first axis remains constant.

DETAILED DESCRIPTION

Figure 1:
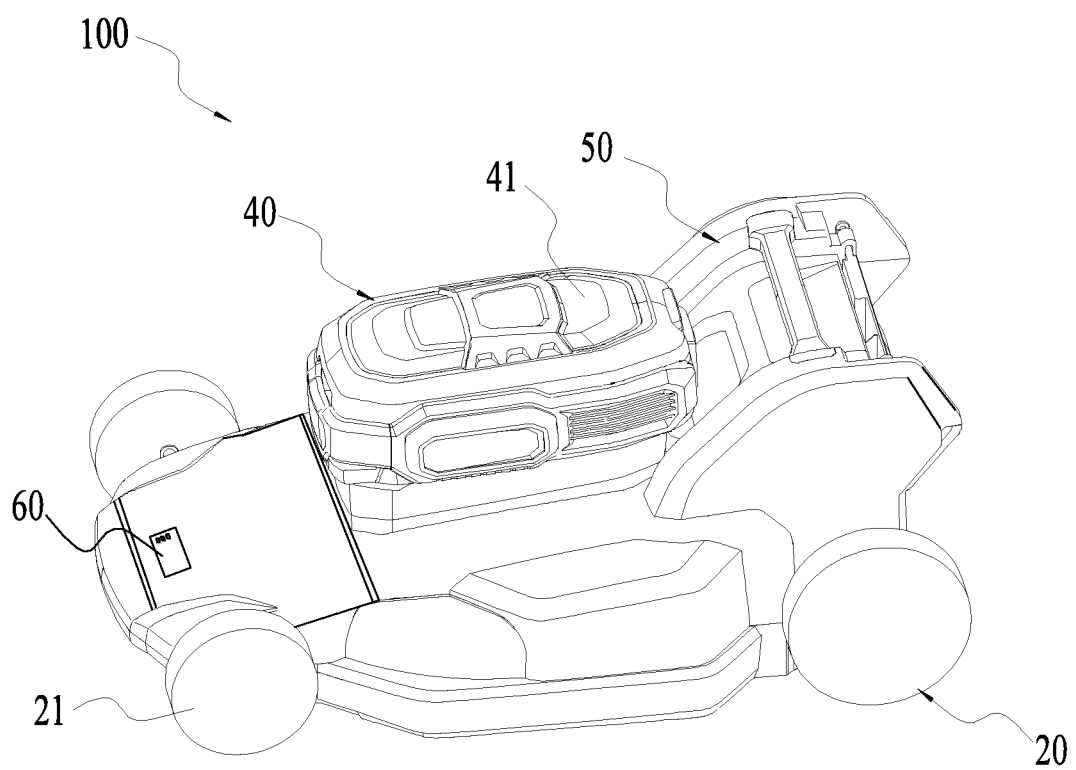
FIG. 1 is a schematic view of a lawn mower according to a first example.

A lawn mower 100 of a first example shown in FIG. 1 is used to mow vegetation such as lawns and weeds. In this example, the lawn mower 100 is a robotic lawn mower that does not need to be pushed by a user, and the robotic lawn mower can automatically mow the lawns without being operating by the user. The lawn mower can also be a push-type lawn mower. For the push-type lawn mower, the user usually stands behind the push-type lawn mower, and the user pushes a handle of the push-type lawn mower to push it to walk on a ground. Alternatively, the lawn mower may also be a riding lawn mower. For the riding lawn mower, the user rides on a seat of the riding lawn mower to operate it to walk on the ground.

Figure 2:
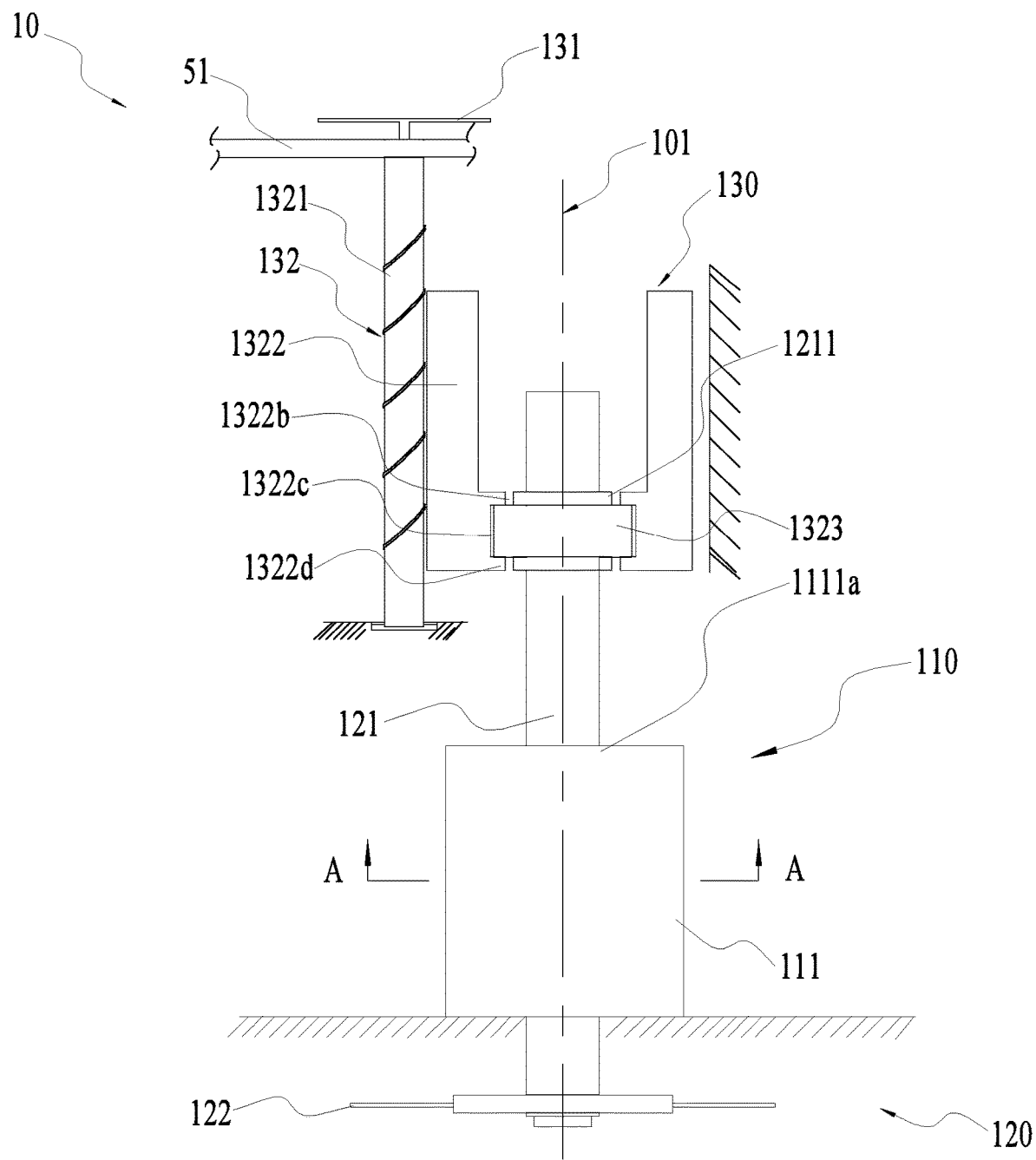
FIG. 2 is a schematic view of a mowing system of the lawn mower of FIG. 1.

As shown in FIGS. 1 and 2, the lawn mower 100 includes a mowing system 10, a working assembly 20, a control assembly, an energy source device 40 and a housing 50. The mowing system 10 is used to implement a mowing function of the lawn mower 100. The working assembly 20 includes a working wheel 21 for driving the lawn mower 100 to walk on. i.e., move over/across, the ground. The control assembly is used to control electrical equipment in the lawn mower 100 and to display intelligent performances of the lawn mower 100. The energy source device 40 is used to provide an energy source for the mowing system 10, the working assembly 20, and the control assembly. In this example, the energy source device 40 is a power source device, and the power source device may include a battery pack 41 installed to the housing 50. The housing 50 is used to support the mowing system 10, the control assembly and the energy source device 40. The walking assembly 20 is installed to the housing 50 and supports the housing 50.

The mowing system 10 includes a driving mechanism 110, a cutting assembly 120, and a height adjusting mechanism 130. The driving mechanism 110 includes a prime mover for outputting power. The cutting assembly 120 includes a mounting shaft 121 and a mowing member 122. The mounting shaft 121 is used to drive the mowing member 122 to rotate about a first axis 101 to realize the mowing function. The mowing member 122 may be a blade for cutting grass. The height adjusting mechanism 130 can adjust the height of the mowing member 122 relative to the housing 50 in the first axis 101, so that the lawn mower 100 has different cutting heights. For example, the height adjusting mechanism 130 can adjust the cutting assembly 120 to move the mowing member 122 to a first height and a second height. When the mowing member 122 is at the first height, the mowing member 122 is closer to the ground, so that more grass on the ground can be cut. When the mowing member 122 is at the second height, the mowing member 122 is far away from the ground, so that less grass on the ground can be cut.

In this example, the height adjusting mechanism 130 can drive the mounting shaft 121 and the mowing member 122 mounted on the mounting shaft 121 to move up and down along the first axis 101. When the height adjusting mechanism 130 adjusts the mounting shaft 121 to move up and down, a position of the prime mover relative to the housing 50 in the first axis 101 remains fixed. In this way, the height adjusting mechanism 130 drives the cutting assembly 120 to move up and down along the first axis 101, but does not drive the prime mover to move up and down synchronously with the cutting assembly 120, so that a total number of parts driven by the height adjusting mechanism 130 that can move up and down in the first axis 101 synchronously with the mowing member 122 is small. A total weight of the parts is also relatively small, thereby improving the comfort of operating of the height adjusting mechanism 130 and the stability of the height adjusting mechanism 130. A weight of loads driven by the height adjusting mechanism 130 is also relatively small, thereby prolonging the service life of the height adjusting mechanism 130. In addition, the housing 50 is formed with or connected with a mounting structure 51. Because the prime mover does not move up and down with the cutting assembly 120, so that the prime mover can be fixedly installed to the mounting structure 51, thereby improving the reliability of the prime mover and reducing the vibration generated by the prime mover during the operation of the lawn mower 100, thereby prolonging the service life of the lawn mower 100. Furthermore, the mounting shaft 121 and the mowing member 122 can be driven by the height adjusting mechanism 130 at the same time to move up and down in the first axis 101, so that the mowing member 122 is stably mounted to the mounting shaft 121, improving the reliability of the cutting assembly 120. Especially for the robotic lawn mower, the size of the robotic lawn mower is relatively small. If the driving mechanism 110 also moves up and down along with the cutting assembly 120, the robotic lawn mower needs a larger space for the driving mechanism 110 and the cutting assembly 120 to move, which is not conducive to the miniaturization of the robotic lawn mower. In this example, the driving mechanism 110 does not move with the cutting assembly 120, so that the internal structure of the robotic lawn mower is relatively compact, thereby facilitating the miniaturization of the robotic lawn mower.

Figure 3:
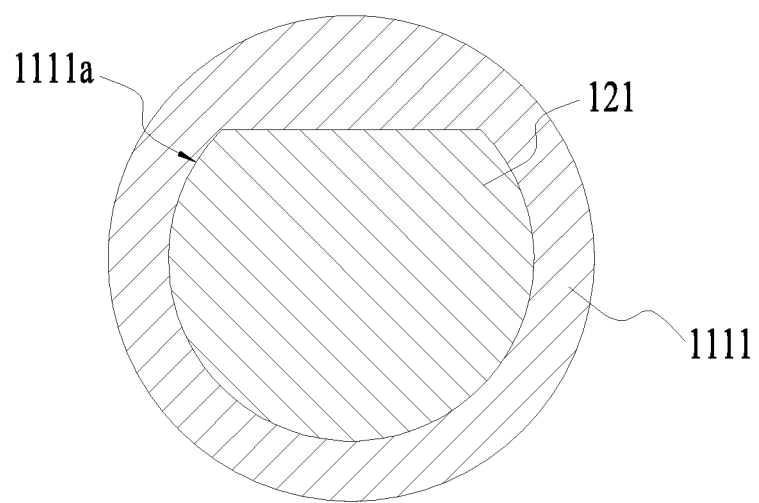
FIG. 3 is a matching schematic view of a driving shaft and a mounting shaft of FIG. 2.

The prime mover includes a driving shaft 1111 for outputting power and the driving shaft 1111 is the prime mover shaft of the prime mover. In this example, the prime mover is an electric motor 111, the electric motor 111 includes a stator assembly and a rotor assembly, the rotor assembly also includes a rotor shaft, and the rotor shaft is the driving shaft 1111 for outputting power of the electric motor 111. When the height adjusting mechanism 130 drives the mounting shaft 121 and the mowing member 122 to move up and down along the first axis 101, the position of the driving shaft 1111 relative to the housing 50 in the first axis 101 remains constant. In the present example, the driving shaft 1111 is arranged along the first axis 101. The driving shaft 1111 is also coaxial with the mounting shaft 121. The driving shaft 1111 is provided with a first mounting hole 1111*a* extending along the first axis 101, the first mounting hole 1111*a* penetrates the driving shaft 1111 along the first axis 101, and the mounting shaft 121 is inserted into or passes through the first mounting hole 1111*a*. When the prime mover is in operation, the driving shaft 1111 can rotate around the first axis 101, and the driving shaft 1111 transmits power to the mounting shaft 121 to drive the mounting shaft 121 to rotate around the first axis 101. The mounting shaft 121 can also slide up and down along the first axis 101 relative to the driving shaft 1111. Specifically, as shown in FIG. 3, the driving shaft 1111 is provided with a driving portion formed on a hole wall of the first mounting hole 1111*a*, the driving portion drives the mounting shaft 121 to rotate synchronously with the driving shaft 1111, and the driving portion allows the mounting shaft 121 to slide up and down relative to the driving shaft 1111. In this example, the driving portion is directly formed on the hole wall of the mounting hole 1111*a* and the driving portion is a transmission plane parallel to the first axis 101. It can be understood that in some other examples, a mounting hole of a driving shaft can also be provided with a driving member, the driving member may be a bushing, the bushing is fixedly connected with the driving shaft, and the bushing forms a driving hole, and a hole wall of the driving hole forms a driving portion that can drive a mounting shaft to rotate with the driving shaft, and the mounting shaft passes through the driving hole.

In the present example, the cutting assembly 120 also includes a mounting member for mounting the mowing member 122 to the mounting shaft 121. The mounting member is a disc, the mowing member 122 is a blade mounted on the disc, and the blade also can rotate relative the disc. The disc is fixed to a preset position on the mounting shaft 121 through fasteners, and there is only one preset position. That is to say, the position of the disc relative to the mounting shaft 121 in the first axis 101 is not adjustable, and the position of the disc relative to the mounting shaft 121 in the first axis 101 is fixed. In this way, the disc can be more stably installed to the mounting shaft 121, so as to prevent the disc from loosening relative to the mounting shaft 121.

The height adjusting mechanism 130 includes an operating member and an adjusting assembly 132. The operating member is used for the user to operate to control cutting heights of the cutting assembly 120. In this example, the operating member is a knob 131 that can be turned by the user. The knob 131 may be arranged below the housing 50 or above the housing 50. In other examples, an operating element may also be an operating button. The lawn mower 100 further includes a display screen 60, and the operating member may be a touch button on the display screen 60, and the display screen 60 is a touch screen.

The adjusting assembly 132 includes an adjusting member 1321 and a mounting bracket 1322. The mounting bracket 1322 is composed of two parts. The adjusting member 1321 is connected to the operating member, and the mounting bracket 1322 is used for mounting the mounting shaft 121. When the user operates the knob 131, the adjusting member 1321 adjusts the mounting bracket 1322 to move along the first axis 101 or a direction parallel to the first axis 101, and the mounting bracket 1322 drives a whole of the mounting shaft 121 and the mowing member 122 along the first axis 101, so that the lawn mower 100 has different cutting heights.

The adjusting member 1321 can rotate around a rotation axis, and the adjusting member 1321 and the mounting bracket 1322 form a transmission fit that can convert the rotation of the adjusting member 1321 into a sliding movement of the mounting bracket 1322 along the first axis 101. The transmission fit may be a direct fit between the adjusting member 1321 and the mounting bracket 1322, or an indirect fit in which a switching structure is provided between the adjusting member 1321 and the mounting bracket 1322. Specifically, the adjusting member 1321 is a screw rod. A first thread is formed on the screw rod, and a second thread that matches the first thread is formed on the mounting bracket 1322. The rotation of the mounting bracket 1322 about the first axis 101 is restricted, that is, the mounting bracket 1322 cannot rotate about the first axis 101. In this way, when the adjusting member 1321 rotates with the knob 131, the adjusting member 1321 will drive the mounting bracket 1322 to move along the first axis 101 under the cooperation of the first thread and the second thread. The screw rod is mounted to the mounting structure 51 of the housing 50.

As shown in FIG. 2, the mounting bracket 1322 is formed with a second mounting hole 1322*b* extending along the first axis 101, and the mounting shaft 121 passes through the second mounting hole 1322*b*. The second mounting hole 1322*b* is also recessed along a radial direction perpendicular to the first axis 101 to form a groove 1322*c*. The adjusting assembly 132 further includes a bearing 1323, the bearing 1323 is installed in the groove 1322*c*, and the bearing 1323 can move synchronously with the mounting bracket 1322 along the first axis 101. A groove wall of the groove 1322*c* is formed with a first limiting portion 1322*d*, and the first limiting portion 1322*d* can restrict the bearing 1323 from separating from the mounting bracket 1322 along the first axis 101. The bearing 1323 also supports the mounting shaft 121, an inner ring of the bearing 1323 can be fixedly connected to the mounting shaft 121, and an outer ring of the bearing 1323 can be fixedly connected to the groove wall of the groove 1322*c*. In this example, the inner ring of the bearing 1323 can be interference fit with the mounting shaft 121, and the outer ring of the bearing 1323 can be interference fit with the groove wall of the groove 1322c.

In the present example, the mounting shaft 121 is formed with or connected with a second limiting portion 1211, and the second limiting portion 1211 can limit the bearing 1323 from disengaging from the mounting shaft 121 along the first axis 101. In the present example, the second limiting portion 1211 is a pair of annular protrusions formed on the mounting shaft 121, and the bearing 1323 is arranged between the pair of annular protrusions. In other examples, a second limiting portion may also be a clamp ring provided on a mounting shaft.

The height adjusting mechanism 130 further includes a sliding rail for restricting the rotation of the mounting bracket 1322, and the sliding rail is installed on the housing 50 along a direction parallel to the first axis 101. One side of the mounting bracket 1322 is used as a sliding block to cooperate with the sliding rail. The sliding rail is formed on the housing 50, or the sliding rail is formed of a part fixed relative to the housing 50. The sliding rail limits the rotation of the mounting bracket 1322 around the first axis 101 and allows the mounting bracket to slide along the sliding rail in the first axis 101. One end of the screw rod is fixed relative to the housing 50, the screw rod can only rotate around the axis of the screw rod, and the other end of the screw rod passes through and is fixedly connected with the knob 131, which can drive the screw rod to rotate when the knob 131 rotates.

When the user operates the knob 131, the screw rod follows the knob 131 to rotate. Because the mounting bracket 1322 is matched with the screw rod, and the other side of the mounting bracket 1322 is fitted in the sliding rail and cannot rotate and move horizontally, the mounting bracket 1322 can move up and down along the slid sliding rail under the rotation of the screw rod.

Because the bearing 1323 is fixed on the mounting bracket 1322, the bearing 1323 has a tendency to move up and down following the mounting bracket 1322, and thus has a tendency to move relative to the mounting shaft 121. Since the mounting shaft 121 is provided with a stopper that restricts the relative movement of the bearing 1323 and the mounting shaft 121, the bearing 1323 will drive the mounting shaft 121 to move up and down when the bearing 1323 is driven by the mounting bracket 1322.

The mounting shaft 121 cooperates with the driving shaft 1111 of the driving mechanism 110. But the mounting shaft 121 cannot drive the driving shaft 1111 to move up and down, thus cannot drive the driving mechanism 110 to move up and down.

Therefore, the height adjusting mechanism 130 only adjusts the height of the mounting shaft 121 and does not adjust the height of other components.

Figure 4:
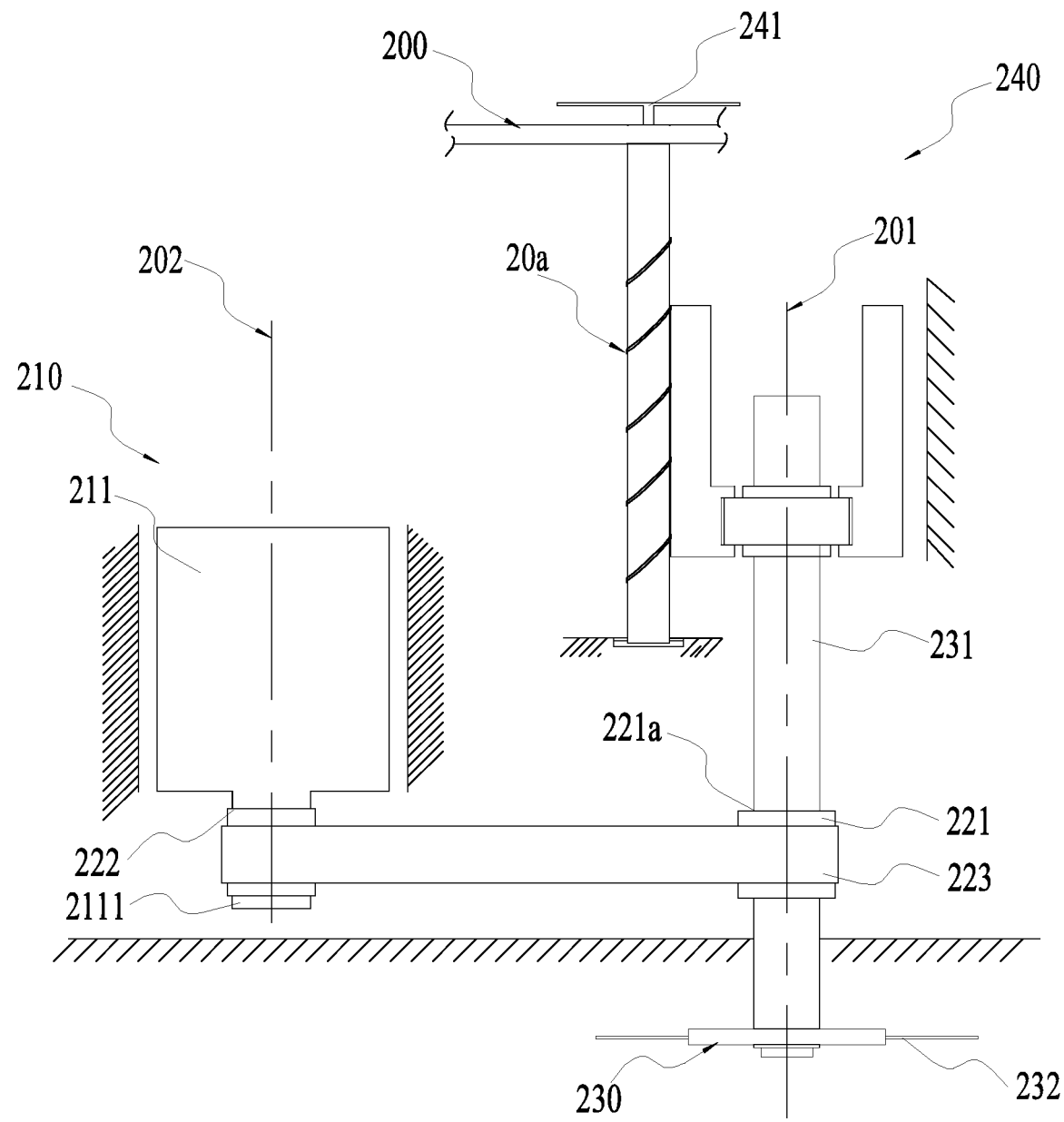
FIG. 4 is a schematic view of a mowing system of a lawn mower according to a second example.

FIG. 4 shows the internal structure of a lawn mower of a second example. In this example, the lawn mower may also be a robotic lawn mower. The lawn mower includes a working assembly, a control assembly, and a power source device which are substantially the same as that in the lawn mower 100 in the first example. The lawn mower of this example further includes a mowing system 20a and a housing for mounting the mowing system 20a, and the housing includes a mounting structure 200. The mowing system 20a includes a cutting assembly 230 and a height adjusting mechanism 240 that are basically the same as that in the lawn mower 100 of the first example. The main difference between this example and the first example is that the mowing system 20a includes a driving mechanism 210 that is different from that in the first example. The driving mechanism 210 includes a prime mover 211 and a transmitting assembly 220 for realizing a power transmission between the prime mover 211 and the cutting assembly. In this example, because the driving mechanism 210 is different from the first example and the driving mechanism 210 is mounted to the housing, the housing also includes another mounting structure 200 for mounting the driving mechanism 210. The following mainly introduces the differences between this example and the first example, and the parts of this example with the same as the first example will not be described in detail.

As shown in FIG. 4, the height adjusting mechanism 240 can adjust a whole of a mounting shaft 231 and a mowing member 232 to move up and down along a first axis 201, so that the lawn mower has different cutting heights.

In this example, the prime mover 211 includes a prime mover shaft 2111 that can rotate about a second axis 202. The transmitting assembly 220 is used to transmit a power output by the prime mover shaft 2111 to the mounting shaft 231.

In this example, the transmitting assembly 220 is mounted to the mounting structure 200 of the housing. The transmitting assembly 220 includes a driving shaft for driving the mounting shaft 231 to rotate, which drives the mounting shaft 231 to rotate synchronously and allows the mounting shaft 231 to move up and down in the first axis 201 relative to it. Here, the driving shaft is considered as a part of the transmitting assembly 220, and the driving shaft is a power output member of the transmitting assembly 220. Of course, it can be considered that the driving shaft is not part of the transmitting assembly 220, but that the transmitting assembly 220 is used to transfer a power between the prime mover 211 and the driving shaft. In this example, the driving shaft is a first driving wheel 221, and the transmitting assembly 220 further includes a second driving wheel 222 and a driving belt 223. The driving belt 223 is a synchronous belt, the first driving wheel 221 and the second driving wheel 222 are synchronous belt wheels, and a torque transmission of the transmitting assembly 220 is constant speed transmission. In other words, the transmitting assembly 220 only transmits a torque without changing the speed, so that the speed of the mounting shaft 231 is the same as that of the prime mover shaft 2111. In other examples, a transmitting assembly can also change the speed transmitted from the prime mover shaft to the mounting shaft so that the speed of the mounting shaft is different from that of the prime mover shaft.

In some other examples, the transmitting assembly may be one or a combination of two or more of belt transmission, rope transmission, friction wheel transmission, gear transmission, chain transmission, screw transmission, or harmonic transmission.

By providing the transmitting assembly 220, the prime mover 211 and the mounting shaft 231 are not arranged on the same axis, an overall size of the driving mechanism 210 and the cutting assembly 230 in a height direction of the housing can be reduced, thereby facilitating the miniaturization of the lawn mower. Moreover, in the present example, the prime mover 211 is a motor, and the transmitting assembly 220 is provided so that the electric motor can be a conventional electric motor in the prior art, which reduces the design and production cost of the motor and can also improve the structural strength and reliability of the motor. Furthermore, the transmitting assembly 220 is provided so that the cutting assembly 230 can be separated from the driving mechanism 210, thereby facilitating maintenance of the driving mechanism 210 and the cutting assembly 230 separately.

Specifically, the second driving wheel 222 is fixedly connected to the prime mover shaft 2111, and the first driving wheel 221 is formed with a driving portion 221a. The driving portion 221a can output torque to the mounting shaft 231 to drive the mounting shaft 231 to rotate synchronously with the first driving wheel 221. The driving portion 221a also allows the mounting shaft 231 to move up and down along the first axis 201. In this way, when the user operates an operating member 241, the height adjusting mechanism 240 can adjust a whole of the mounting shaft 231 and the cutting member 232 to move up and down along the first axis 201 relative to the transmitting assembly 220, thereby enabling the lawn mower to have different cutting heights.

In the present example, the height adjusting mechanism 240 only drives the cutting assembly 230 to move up and down in the first axis 201, while the prime mover 211 and the transmitting assembly 220 are kept constant relative to the housing in the first axis 201. A total number of parts driven by the height adjusting mechanism 240 that can move up and down in the first axis 201 synchronously with the mowing member 232 is small, and a total weight of the parts is also relatively small, thereby improving the comfort of operation of the height adjusting mechanism 240 and improving the stability of the height adjusting mechanism 240. The weight of loads driven by the height adjusting mechanism 240 is also relatively small, thereby prolonging the service life of the height adjusting mechanism 240. In addition, since the prime mover 211 and the transmitting assembly 220 do not move up and down together with the cutting assembly 230, the prime mover 211 and the transmitting assembly 220 can be mounted to the mounting structure 200 of the housing, thereby improving the reliability of the prime mover 211 and the transmitting assembly 220, reducing the vibration generated by the prime mover 211 and the transmitting assembly 220 during the operation of the lawn mower, thereby extending the service life of the lawn mower. Furthermore, the mounting shaft 231 and the mowing member 232 can be driven by the height adjusting mechanism 240 to move up and down in the first axis 201, so that the mowing member 232 is stably mounted to the mounting shaft 231, which improves the reliability of the cutting assembly 230.

In the present example, the fit between the first driving wheel 221 and the mounting shaft 231 is clearance fit. When the mounting shaft 231 moves up and down under an external force, because the mounting shaft 231 is in the clearance fit with the first driving wheel 221, the mounting shaft 231 does not drive the first driving wheel 221 and the driving belt 223 matched with the first driving wheel 221 to move up and down, so the prime mover 211 dose not move with the mounting shaft 231 when the mounting shaft 231 moves up and down.

The driving mechanism 210 can be assembled at any position in the housing under a premise of ensuring that the prime mover shaft 2111 can transmit torque to the mounting shaft 231 through the transmitting assembly 220, so that it can also be assembled at a more reasonable position according to the position of a center of gravity of the lawn mower and the arrangement of internal structures.

The second axis 202 on which the prime mover shaft 2111 rotates does not overlap with the first axis 201 on which the mounting shaft 231 rotates.

Preferably, the first axis 201 and the second axis 202 are parallel to each other and spaced apart by a distance. The second axis 202 is parallel to and not coincident with the first axis 201. Alternatively, in some other examples, a second axis and a first axis may be perpendicular to each other, or the second axis may be inclined relative to the first axis.

Figure 5:
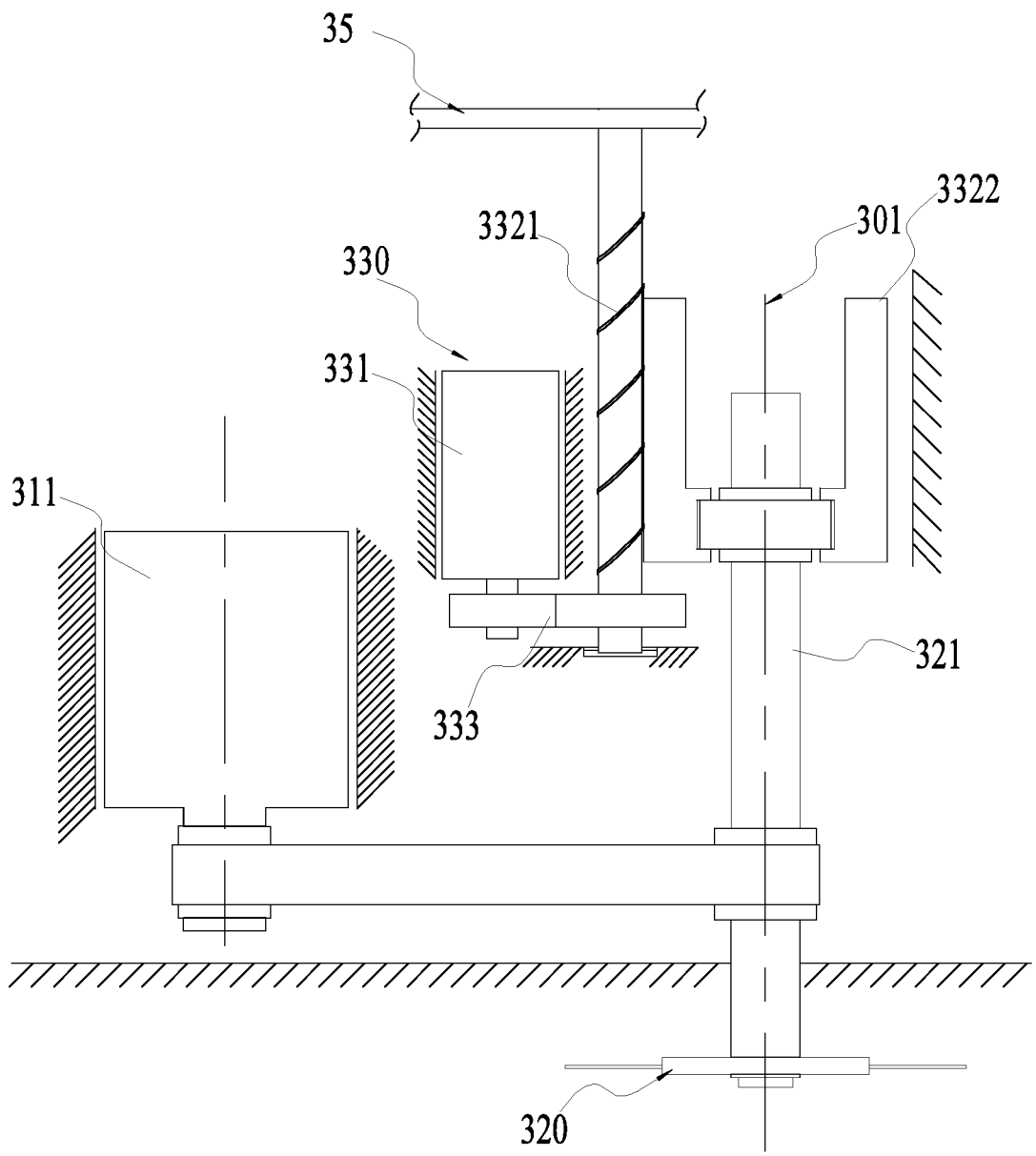
FIG. 5 is a schematic view of a mowing system of a lawn mower according to a third example.

FIG. 5 shows the internal structure of a lawn mower of a third example. In this example, the lawn mower may also be a robotic lawn mower. The structure of the lawn mower is basically the same as that of the lawn mower in the second example. The main difference is that the lawn mower in this example is not used for a user to manually adjust a knob to achieve speed regulation, but a driving motor 331 is provided in an adjusting mechanism 330, the driving motor 331 drives an adjusting member 3321 to rotate through a gear assembly 333, and then the adjusting member 3321 drives a mounting bracket 3322 and a mounting shaft 321 to move up and down along a first axis 301. In this way, an electric adjustment of the cutting height of the cutting assembly 320 can be realized, thereby facilitating the user's operation. Moreover, the driving motor 331 may also be connected with a controller and a detecting device, the detecting device detects load parameters, grass height parameters, etc., and the controller controls the operation of the driving motor 331 according to a detection result of the detection device to adjust the cutting assembly 320 to a corresponding cutting height. Alternatively, in other examples, a driving motor 331 can also be connected to a control panel, and the user can input a cutting height on the control panel, and then the driving motor 331 operates to adjust the cutting assembly 320 to a corresponding cutting height. In this example, the driving motor 331 and a prime mover are both arranged in a housing 35.

What is claimed is:

1. A robotic lawn mower, comprising:
   a mowing system for mowing grass comprising a controller operably coupled to control operation of the robotic lawn mower;
   a housing configured to support the mowing system;
   a working assembly comprising a working wheel configured to support the housing to drive the robotic lawn mower to walk on a ground; and
   an energy source device used to provide an energy source;
   wherein the mowing system comprises:
      a cutting assembly comprising a mowing member for cutting the grass and a mounting shaft for mounting the mowing member, wherein the mounting shaft is capable of rotating about a first axis relative to the housing;
      a driving mechanism comprising an electric motor, the electric motor comprising a stator assembly and a rotor assembly, the rotor assembly comprising a driving shaft for driving the cutting assembly to rotate, wherein the driving shaft is provided with a mounting hole and the mounting shaft is inserted into or passes through the mounting hole; and
      a height adjusting mechanism for adjusting the movement of the cutting assembly along the first axis to achieve different cutting heights of the mowing member;
   wherein, when the height adjusting mechanism adjusts the cutting assembly to move along the first axis, the mounting shaft moves relative to the driving shaft along the first axis.

2. The robotic lawn mower of claim 1, wherein, when the height adjusting mechanism drives the cutting assembly to move along the first axis, a position of the driving shaft relative to the housing in the first axis remains constant.

3. The robotic lawn mower of claim 1, wherein the driving shaft is formed with a driving portion for driving the mounting shaft to rotate synchronously with the driving shaft and the driving portion allows the mounting shaft to move relative to the driving shaft along the first axis.

4. The robotic lawn mower of claim 3, wherein the driving portion is formed on a hole wall of the mounting hole.

5. The robotic lawn mower of claim 1, wherein the height adjusting mechanism comprises an operating member for a user to operate, an adjusting assembly comprising an adjusting member and a mounting bracket for mounting the mounting shaft, and, when the operating member is operated by the user, the adjusting member drives the mounting bracket to move along the first axis.

6. The robotic lawn mower of claim 5, wherein the adjusting member is capable of a rotation about a rotation axis relative to the housing and the adjusting member and the mounting bracket form a transmission fit that can convert the rotation of the adjusting member into a sliding movement of the mounting bracket along the first axis.

7. The robotic lawn mower of claim 1, wherein when the height adjusting mechanism adjusts the cutting assembly to move along the first axis, the electric motor remains fixed relative to the housing along the first axis.

8. The robotic lawn mower of claim 7, wherein the driving shaft is a prime mover shaft of the electric motor.

9. The robotic lawn mower of claim 7, wherein the driving mechanism further comprises a transmitting assembly for realizing a power transmission between the electric motor and the mounting shaft and the driving shaft is a power output member of the transmitting assembly.

10. The robotic lawn mower of claim 9, wherein, when the height adjusting mechanism adjusts the cutting assembly to move along the first axis, a position of the transmitting assembly relative to the housing along the first axis remains constant.

11. The robotic lawn mower of claim 9, wherein the electric motor comprises a electric motor shaft and the electric motor shaft is capable of rotating about a second axis that is parallel to and not coincident with the first axis.

12. The robotic lawn mower of claim 9, wherein the electric motor comprises a prime mover shaft which is capable of rotating about a second axis perpendicular to or inclined to the first axis.

13. The robotic lawn mower of claim 1, wherein when the height adjusting mechanism adjusts the cutting assembly to move along the first axis, the mounting shaft moves relative to the electric motor along the first axis.

14. The robotic lawn mower of claim 1, wherein the height adjusting mechanism further comprises a driving motor for driving the mounting shaft to move along the first axis.

15. The robotic lawn mower of claim 14, wherein the driving mechanism comprises a prime mover for outputting power to drive the cutting assembly to mow grass and the prime mover and the driving motor are arranged in the housing.

16. A robotic lawn mower, comprising:
a mowing system for mowing grass comprising a controller operably coupled to control operation of the robotic lawn mower;
a housing configured to support the mowing system;
a working assembly comprising a working wheel configured to support the housing to drive the robotic lawn mower to walk on a ground; and
a battery pack used to provide an energy source;
wherein the mowing system comprises:
a cutting assembly comprising a mowing member for cutting the grass and a mounting shaft for mounting the mowing member, wherein the mounting shaft is rotatable about a first axis relative to the housing;
a driving mechanism comprising an electric motor, the electric motor comprising a stator assembly and a rotor assembly, the rotor assembly comprising a driving shaft for driving the cutting assembly to rotate, wherein the driving shaft is provided with a mounting hole and the mounting shaft is inserted into or passes through the mounting hole; and
a height adjusting mechanism for adjusting movement of the cutting assembly along the first axis to achieve different cutting heights of the mowing member;
wherein, when the height adjusting mechanism adjusts the cutting assembly to move along the first axis, the mounting shaft moves relative to the electric motor along the first axis.

17. The robotic lawn mower of claim 16, wherein the driving mechanism further comprises a transmitting assembly for realizing a power transmission between the electric motor and the mounting shaft and, when the height adjusting mechanism adjusts the cutting assembly to move along the first axis, the mounting shaft moves relative to the transmitting assembly along the first axis.

18. The robotic lawn mower of claim 16, wherein the height adjusting mechanism further comprises a driving motor for driving the mounting shaft to move along the first axis.

19. The robotic lawn mower of claim 16, wherein the electric motor is fixedly mounted to the housing.

20. A lawn mower, comprising:
a mowing system for mowing grass;
a housing configured to support the mowing system;
a working assembly comprising a working wheel configured to support the housing to drive the lawn mower to walk on a ground; and
a battery pack used to provide an energy source;
wherein the mowing system comprises:
a cutting assembly comprising a mowing member for cutting the grass and a mounting shaft for mounting the mowing member, wherein the mounting shaft is capable of rotating about a first axis relative to the housing;
a driving mechanism comprising an electric motor the electric motor comprising a stator assembly and a rotor assembly, the rotor assembly comprising a driving shaft for driving the cutting assembly to rotate, wherein the driving shaft is provided with a mounting hole and the mounting shaft is inserted into or passes through the mounting hole; and
a height adjusting mechanism for adjusting movement of the cutting assembly along the first axis to achieve different cutting heights of the mowing member;
wherein, when the height adjusting mechanism adjusts the cutting assembly to move along the first axis, a position of the electric motor relative to the housing in the first axis remains constant.

* * * * *

UNITED STATES PATENT AND TRADEMARK OFFICE
CERTIFICATE OF CORRECTION

| | | |
|---|---|---|
| PATENT NO. | : 12,144,283 B2 | Page 1 of 1 |
| APPLICATION NO. | : 17/113541 | |
| DATED | : November 19, 2024 | |
| INVENTOR(S) | : Haishen Xu | |

It is certified that error appears in the above-identified patent and that said Letters Patent is hereby corrected as shown below:

On the Title Page

Add:
Item [30] Foreign Application Priority Data
December 7, 2019 (CN) ................ 201911245936

Signed and Sealed this
Fourth Day of March, 2025

Coke Morgan Stewart
*Acting Director of the United States Patent and Trademark Office*